(12) United States Patent
Lopes et al.

(10) Patent No.: US 7,877,372 B1
(45) Date of Patent: Jan. 25, 2011

(54) METHOD AND SYSTEM FOR QUERYING TABLES STORED ON MULTIPLE PROCESSING MODULES

(75) Inventors: Arthur Vargas Lopes, San Diego, CA (US); Jerry Lynn Klindt, Hawaiian Gardens, CA (US); Kuorong Chiang, Cerritos, CA (US); Donald Raymond Pederson, San Diego, CA (US); Pradeep Sathyanarayan, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 678 days.

(21) Appl. No.: 10/852,248

(22) Filed: May 24, 2004

(51) Int. Cl.
*G06F 7/00* (2006.01)
*G06F 17/30* (2006.01)
(52) U.S. Cl. .......................... 707/713; 707/718; 707/719
(58) Field of Classification Search .................... 707/2, 707/3, 713, 718, 719
See application file for complete search history.

(56) References Cited

U.S. PATENT DOCUMENTS

| 5,819,255 | A | * | 10/1998 | Celis et al. | 707/2 |
|---|---|---|---|---|---|
| 5,870,747 | A | * | 2/1999 | Sundaresan | 707/101 |
| 5,943,666 | A | * | 8/1999 | Kleewein et al. | 707/2 |
| 6,092,062 | A | * | 7/2000 | Lohman et al. | 707/2 |
| 2004/0225639 | A1 | * | 11/2004 | Jakobsson et al. | 707/2 |
| 2005/0102276 | A1 | * | 5/2005 | Dinh et al. | 707/3 |

* cited by examiner

*Primary Examiner*—John R. Cottingham
*Assistant Examiner*—Mariela D Reyes
(74) *Attorney, Agent, or Firm*—Howard Speight

(57) ABSTRACT

A method, computer program, and database system are disclosed for querying tables stored on multiple processing modules. The method includes specifying module group characteristics. A plurality of modules corresponding to the module group characteristics are then identified. The identified modules are sampled for statistics concerning at least one table specified in a query. An execution plan for the query is optimized based at least in part on the sampled statistics.

24 Claims, 6 Drawing Sheets

METHOD AND SYSTEM FOR QUERYING TABLES STORED ON MULTIPLE PROCESSING MODULES

BACKGROUND

Query optimization is important in relational database systems that deal with complex queries against large volumes of data. Unlike earlier navigational databases, a query on a relational database specifies what data is to be retrieved from the database but not how to retrieve it. Optimizing a query against a relational database is not as important in transaction-oriented applications where only a few rows are accessed because the query causes the data to be accessed using a highly selective index. In decision support and data mining applications, where the space of possible solutions is large and the penalty for selecting a bad query is high, optimizing a query to reduce overall resource utilization can provide orders of magnitude of overall performance improvement.

When the relational database system stores subsets of table data on individual processing modules, the execution plan for the query includes instructions to each virtual processor module specifying how that module should contribute. An optimizer programmed to determine the most efficient execution plan can use known statistics regarding the data, e.g. metadata, to compare different plans. Resource conserving plans can be identified with greater statistical confidence if the distribution of data across the multiple processing modules is determined more accurately.

SUMMARY

In general, in one aspect, the invention features a method querying tables stored on multiple processing modules. The method includes specifying module group characteristics. A plurality of modules corresponding to the module group characteristics are then identified. The identified modules are sampled for statistics concerning at least one table specified in a query. An execution plan for the query is optimized based at least in part on the sampled statistics.

Implementations of the invention may include one or more of the following: setting a value in a table definition that specifies module group characteristics, sampling the number of rows of a table on each identified module, and optimizing based on an average of the statistics sampled from each identified module.

In general, in another aspect, the invention features a computer program for querying tables stored on multiple processing modules. The program includes executable instructions that cause a computer to store a specification of module group characteristics. The computer is also caused to identify a plurality of modules corresponding to the module group characteristics. The computer is also caused to sample the identified modules for statistics concerning at least one table specified in a query. The computer is also caused to optimize an execution plan for the query based at least in part on the sampled statistics.

In general, in another aspect, the invention features a database system for executing database queries that include multiple alternative equality conditions between a database column and a set of values. The database system includes one or more nodes; a plurality of CPUs, each of the one or more nodes providing access to one or more CPUs; and a plurality of virtual processors, each of the one or more CPUs providing access to one or more virtual processors, each virtual processor configured to manage data, including rows organized in tables, stored in one of a plurality of data-storage facilities.

The database system also includes an optimizer that is configured to store a specification of virtual processor group characteristics. The optimizer is also configured to identify a plurality of virtual processors corresponding to the virtual processor group characteristics. The optimizer is also configured to sample the identified virtual processors for statistics concerning at least one table specified in a query. The optimizer is also configured to optimize an execution plan for the query based at least in part on the sampled statistics.

DETAILED DESCRIPTION

Figure 1:
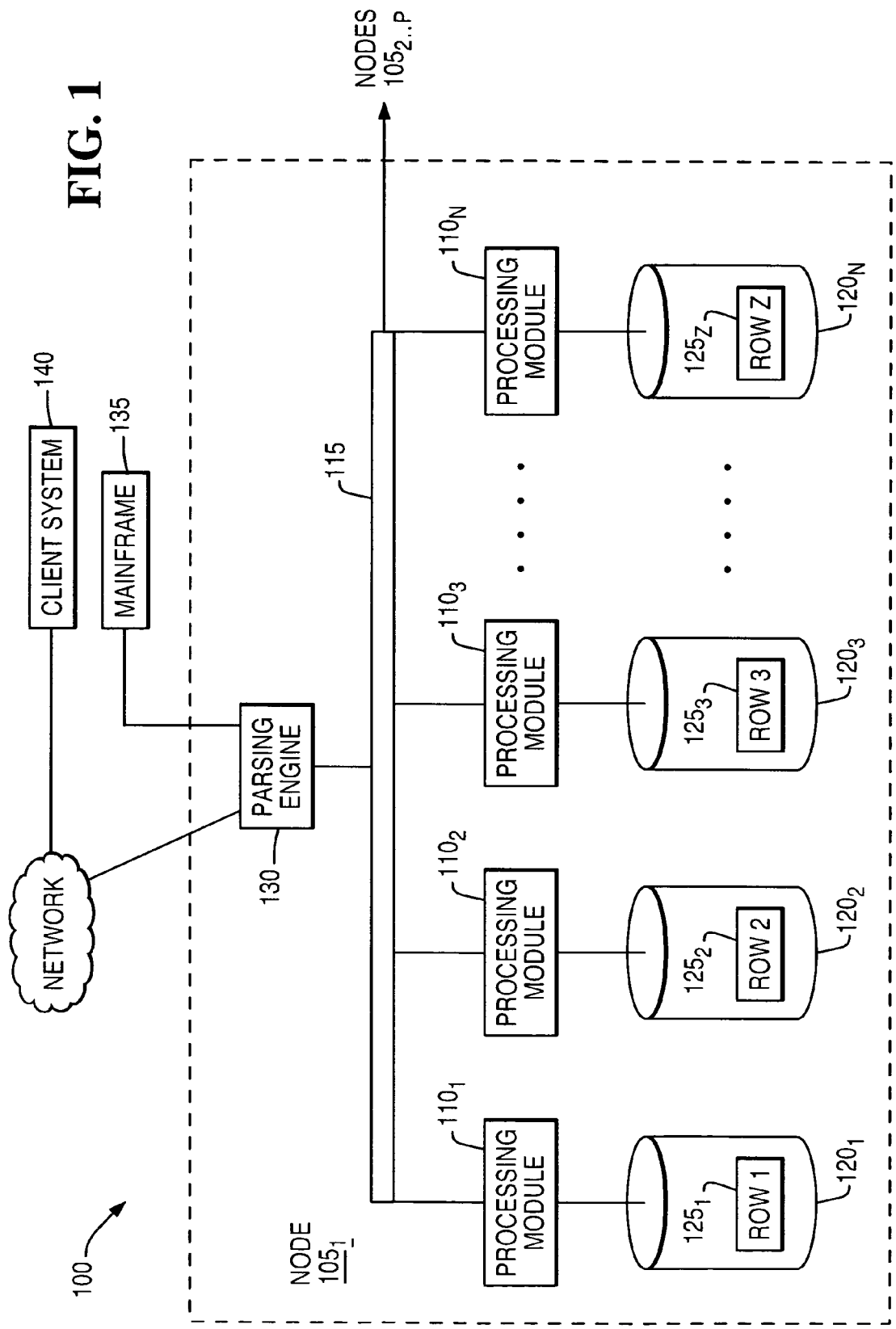
FIG. 1 is a block diagram of a node of a parallel processing database system.

The query optimization technique disclosed herein has particular application, but is not limited, to large databases that might contain many millions or billions of records managed by the database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_1 \ldots N$. Each of the processing modules $110_{1 \ldots N}$ may be one or more physical processors or each may be a virtual processor, with one or more virtual processors running on one or more physical processors. The virtual processors can support virtual processes. One type of processing modules are referred to as AMPs or Access Module Processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots P}$ in addition to the illustrated node $105_1$, connected by extending the network 115.

The system stores data in one or more tables in the data-storage facilities $120_{1 \ldots N}$. The rows $125_1 \ldots z$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
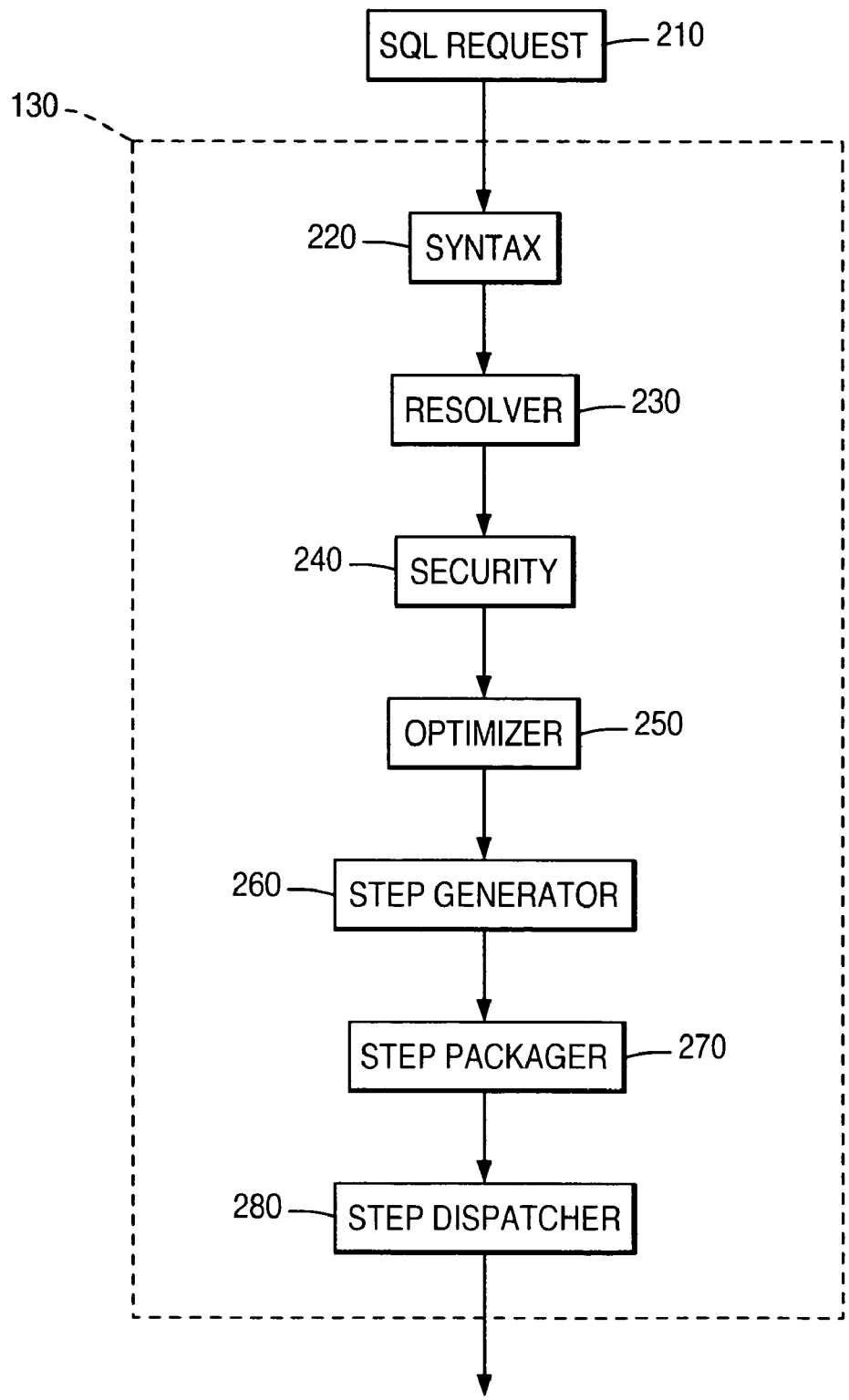
FIG. 2 is a block diagram of a parsing engine.

FIG. 2 is a block diagram of the parsing engine 130. An SQL request 210 is submitted to the parsing engine 130 and is initially checked for syntax correctness 220. The resolver 230 then checks for and reports semantic errors and determines additional conditions based on transitivity. If one condition requires that the price is $10 and another requires that the cost is half the price, a third condition can be determined by transitivity: the cost is $5. The new conditions can be redundant with the original conditions, but can result in faster execution. For example, it is possible for a query to run more quickly with conditions of price=$10 and cost=$5 than with conditions of price=$10 and cost=50% (price).

Once the query has been processed by the resolver 230, it is passed to the security component 240 of the parsing engine 130. The security component 240 checks the security level of the database user who initiated the query. The security component 240 also checks the security level of the information sought by the request. If the user's security level is less than the security level of the information sought, then the query is not executed.

Once the query passes security it is analyzed by the optimizer 250. The optimizer 250 determines possible series of steps for executing the query. The optimizer 250 also estimates the costs associated with each series of steps. The cost associated with a series of steps is related to the amount of data encompassed by each condition corresponding to a step in the series. The execution of a query involves temporary results and sub-query results and the amount of data in those results is one factor in determining the costs of executing the query. A temporary result whose generation requires a large amount of system resources has high cost.

After estimating the costs associated with potential query execution plans, the optimizer 250 chooses the plan that has the lowest estimated cost. The more accurate the estimates of cost for particular execution plans are, the more likely the optimizer 250 is to choose the optimal plan. The optimizer 250 can access statistics describing the information stored in the database to help estimate the cost of conditions and temporary results corresponding to steps in query execution plans. In some situations, however, there may be no stored statistics.

The plan chosen by the optimizer 250 is passed to the step generator 260. The steps are then sent to the step packager 270 and dispatched from the step dispatcher 280. If the plan chosen is not the optimal plan, the steps generated will require the use of more resources than the steps that would be generated by another plan that yields the same output. In a parallel database system servicing thousands of concurrent users, an increase in the resources employed for reach query can result in longer wait times for every user.

Figure 3:
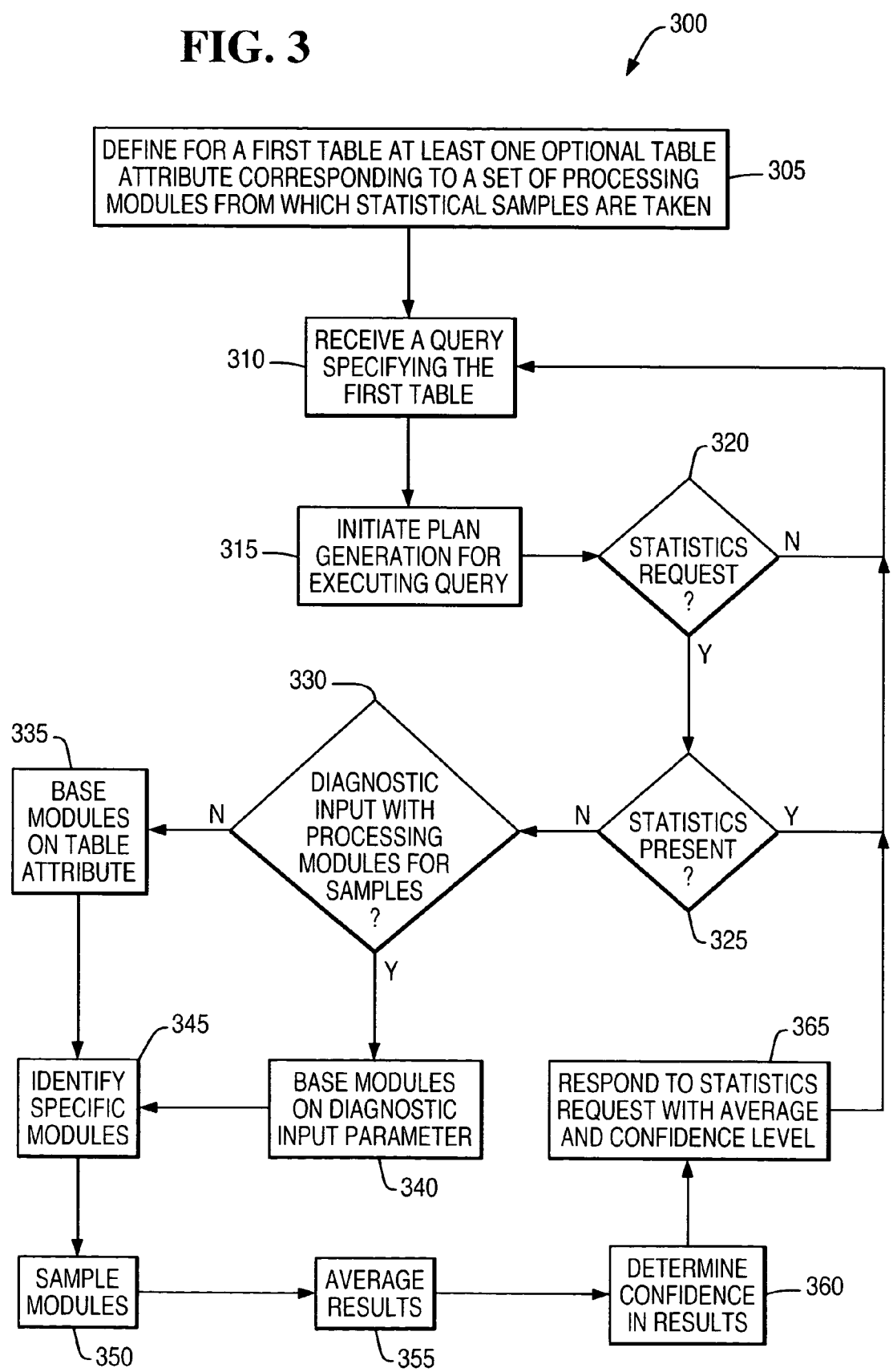
FIG. 3 is a flow chart of one method for querying tables stored on multiple processing modules.

FIG. 3 is a flow chart of one method 300 for querying tables stored on multiple processing modules. First, a first table is defined with at least one optional table attribute corresponding to a set of processing modules from which statistical samples will be taken 305. One implementation of such a table attribute, SAMPLEAMP, is shown below.

---

CREATE TABLE T1(Column1 Integer PRIMARY INDEX
,Column2 Char(20))
,SAMPLEAMP=N;

---

The preceding implementation creates a two column table with identifier T1. The attribute that specifies the module group characteristics is SAMPLEAMP and it is set to a particular number, N, of random processing modules. Many other module group characteristics can be used. For example, all the modules in a random node can be specified, all the modules in the database system configuration can be specified, or a percentage of the modules in the database system configuration can be specified. Modes for a prespecified number of processing modules could also be defined. For example, modes for two or five modules can be allowed.

Once the table is created, whether or not the optional attribute is set, a query can be received 310 that specifies that table. One example query specifying the above-defined table, as well as a second table T2, is shown below.

---

SELECT * FROM T1 WHERE
    T1.Column2 IN (SELECT T2.Column2 FROM T2);

---

As discussed with reference to FIG. 2, the query is processed by the various components of the parsing engine 130. When the query reaches the optimizer 250, various plans for executing the query are generated 315. The efficiency of one plan relative to another can depend upon the data structure of the tables addressed in the query. As just one example, first and second potential execution plans could be generated for the query where the first execution plan will require fewer resources than the second execution plan if there are fewer than 500 rows of T1 stored on each processing module. When the efficiency choice between plans depends upon the characteristics of the stored data, a request can be made for statistics that indicate the characteristics 320. If no requests for statistics are made, then the query is executed according to the chosen plan, which did not require statistics to choose, and the system waits for the next query to be received 310. If a request for statistics is received, then the database system determines if the required statistics are already available 325. For example, in some database systems there are times during the day or week when usage is low and the system can collect statistics regarding the data. Those statistics are stored and can be accessed by the optimizer 250 in choosing plans. The chosen plan is executed and the system waits for the next query to be received 310. Such statistics are not always present, however, and the optimizer can then sample the data to choose between the execution plans.

In one implementation of sampling the data, the optimizer 250 can determine whether a diagnostic input specified module characteristics that can be used to choose the processing modules for samples 330. One example of such a diagnostic input is DIAGNOSTIC SAMPLEAMP=N FOR SESSION.

Queries received in the session after that diagnostic input would use N processing modules to generate statistics based on sampling. If there is no diagnostic input, the module group characteristics specified by the table attribute are used 335. If there is a diagnostic input, the module group characteristics it specified are used 340. In another implementation, the table attribute is used when there is both a table attribute and a diagnostic input. When there is neither a table attribute nor a diagnostic input, a default can be used. In one implementation, the default could be one random processing module. In a conventional system, sampling always is done with one random processing module, making that the required setting rather than a default.

Once the applicable module group characteristics are specified, the specific modules are identified in accordance with those characteristics 345. One implementation of identifying modules is discussed in more detail in FIGS. 4 and 5.

Once the specific modules are identified, those modules are sampled for the statistics 350 requested by the optimizer 250. For example, the optimizer 250 may request the number of rows of T1 that are stored on each module. That information can be estimated based on sampling the identified modules. One implementation of sampling modules is discussed in more detail in FIG. 6. In one implementation, the results of sampling each module are averaged 355. For example, if the optimizer 250 requests stored rows per module for table T1, and 4 modules are sampled having 20, 24, 22, and 26 rows, respectively, the averaging implementation can return 23 rows as the estimate for the number of rows of T1 stored on each module.

In one implementation, a confidence level is then determined for the results based at least in part on the identified processing modules. For example, the number of identified processing modules can be compared to the total number of processing modules in the configuration to determine a confidence level. One implementation of determining a confidence level is disclosed below:

---
FUNCTION HighConfidence(Results,NAMPS,ActualNoAMPs)
   BEGIN
     1. If ActualNoAMPs < 5 AND ActualNoAMPs < (NAMPS X 0.5)
     then
       a. Return false;
     2. If CrossValidationIsNotOk (Results,ActualNoAMPs) then
       (A form of cross-validation will be applied so that the average from
the results is used to validate the results of each the processing modules
involved.)
       a. Return false;
     3. Return true.
   END.
---

A response is then sent to the optimizer 250 with the average results and a confidence level. The optimizer 250 takes the response into account in determining whether to choose one execution plan or another for the query.

Figure 4:
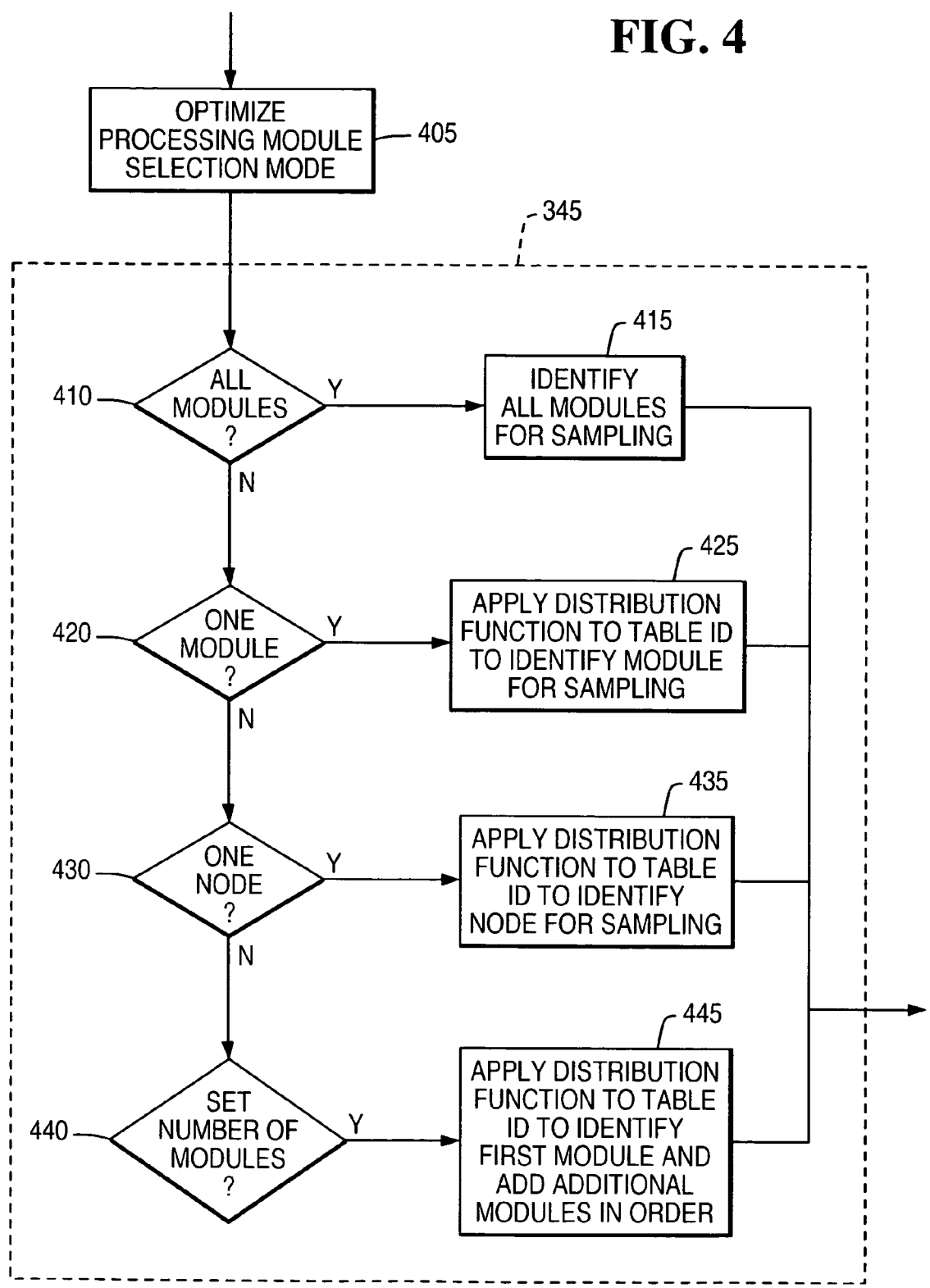
FIG. 4 is a flow chart of one method of identifying specific processing modules.

FIG. 4 is a flow chart of one method 345 of identifying specific modules. In one implementation, the module group characteristics (specified in one implementation by a mode selection) are optimized 405. An example optimization is discussed in further detail in FIG. 5. If the group characteristics have been specified as all processing modules 410, then all modules in the configuration are identified for sampling 415. If the group characteristics have been specified as one processing module 420, then a distribution function is applied to the table identification, e.g., T1, to identify the single processing module for sampling 425. Other random number generation methods are available for determining the module in other implementations. If the group characteristics have been specified as the processing modules associated with one node 430, then a distribution function is applied to the table identification, e.g., T1, to identify a single processing module and all the modules in the node containing that module are identified for sampling 435. If the group characteristics have been specified as a set number of processing modules 440, then a distribution function is applied to the table identification, e.g., T1, to identify a processing module and additional modules are added in order for sampling 445. For example, in one database system there could be three processing modules specified and 12 modules in the configuration. If the distribution function applied to the table results in an 11, modules 11, 12, and 1 would be identified for sampling. Other random number generation methods are available for determining the modules in other implementations. The identified processing modules are then returned for sampling. An example of one computer program for identifying specific modules is disclosed below.

---
PROCEDURE MultiAMPSample(IN Mode, T, C ; OUT Results)
BEGIN
   1. AMode ← GetAMode (Mode);
   2. If AMode equals to DEFAULT or NODE then
     a. AmpNo ← Hash(Table id). This gives the Amp number to which the
     message should be sent;
     b. Send an express request message to the AmpNo if it is the
     DEFAULT AMP sampling or to all the AMPs in the node where
     the AmpNo resides if it is node level sampling;
     c. Record the number of AMPs to which the messages have been sent in
     TotalAmpMsgsSent;
     d. Process the response from AMPs by using the algorithm
     ProcessResponse;
   3. Else if AMode is all AMP Then
     a. Send one single express request message to all AMPs in that system;
     b. Record the number of AMPs to which the messages have been sent
     in TotalAmpMsgsSent;
     c. Process the response from AMPs by using the algorithm
     ProcessResponse;
   3. Else if AMode is a number Then
     a. AmpNo ← Hash(TableId);
     b. Send an express request message to the AmpNo as if it was a
     default mode AMP Sampling;
     c. Process the response from AMPs. Refer to algorithm
     ProcessResponse below;
     d. If ProcessResponse returns Ok then
       i. send the messages to the remaining set of AMPs Record the
       number of AMPs to which the express request messages have
       been sent in TotalAmpMsgsSent;
END.
---

Figure 5:
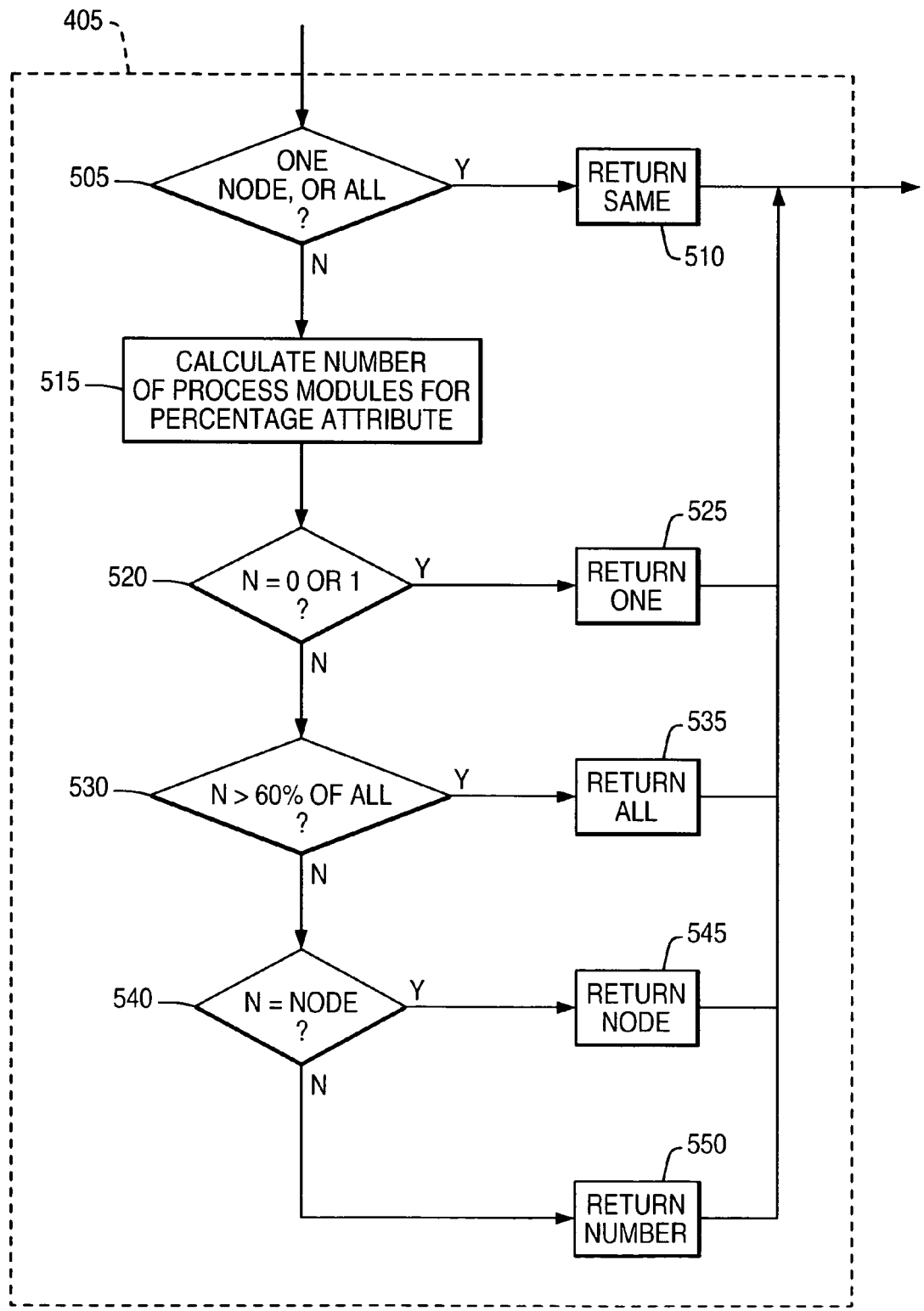
FIG. 5 is a flow chart of one method of optimizing a module selection mode.

FIG. 5 is a flow chart of one method 405 of optimizing a module selection mode. In another implementation, the modes are not optimized. If the mode chosen is one module, the modules in one node, or all the modules 505, then the mode is not changed 510. If the mode is a percentage of the modules in the configuration, then the percentage is multiplied by the total number and rounding is applied to produce an integral number of modules 515. If the number of modules chosen is zero or one 520, then the mode is changed to one module 525. If the number of modules chosen is greater than 60% of all the modules in the configuration 530, then the mode is changed to all modules 535. In different implementations, a decision point different than 60% could be used. A decision point can be determined based on the amount of resources necessary to sample all the modules as opposed to a large number of them. If the number of modules chosen is equal to the number of modules in a node 540, then the mode is changed to one node 545. Otherwise the mode stays as a number of modules 550. An example of one computer program for optimizing a module selection mode is disclosed below.

```
FUNCTION GetAMode(Mode) RETURNS <mode type>:
BEGIN
    1. If Mode is equal to DEFAULT Or NODE Or ALL then
        a. Return Mode;
    2. If Mode is equal to NUMBER then
        a. If N equals to 0 or 1 then
            i. Return DEFAULT;
        b. If N > 60% of TOTALAMPS then
            i. Return ALL;
        c. If N equals the number of AMPs in a node then
            i. Return NODE;
        d. Return Mode;
    3. If Mode is equal to PERCENTAGE then
        a. AP ← P% of TOTALAMPS;
        b. If AP equals to >= 0 And <= 1 then
            i. Return DEFAULT;
        c. If AP > 60% of TOTALAMPS then
            i. Return ALL;
        d. If AP equals the number of AMPs in a node then
            i. Return NODE;
        e. Return (NUMBER, AP);
    4. Else
        a. Abort("Illegal Mode");
END.
```

Figure 6:
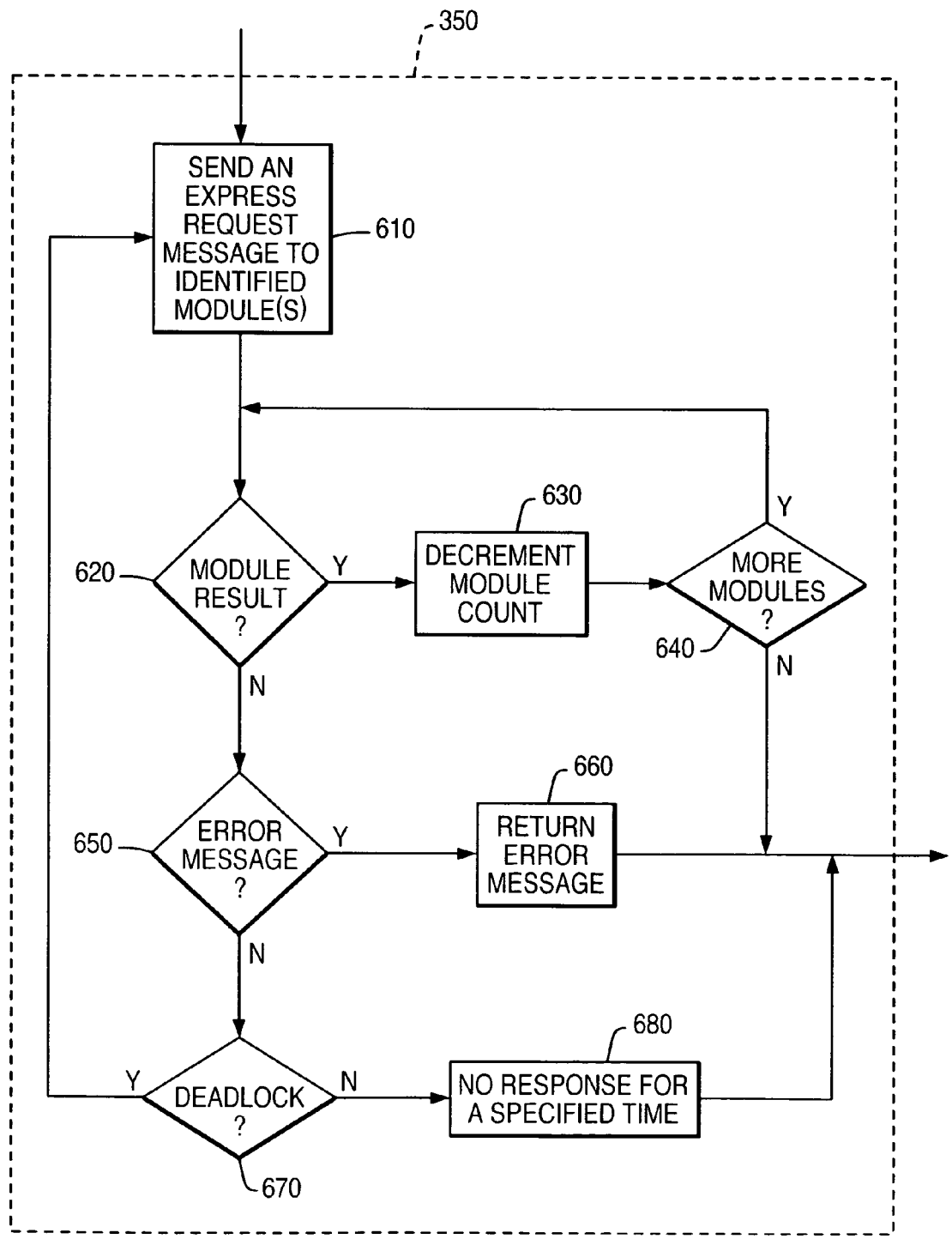
FIG. 6 is a flow chart of one method of sampling identified modules.

FIG. 6 is a flow chart of one method 350 of sampling identified modules. An express request message is sent to each of the identified module(s) 610. If a module result is received 620, the number of module messages outstanding is decremented 630 and if there are more modules 640, the process waits for more results. If the messages outstanding is decremented to zero 640, the results are returned. If an error message is received 650, the error message is returned 660. If a deadlock occurs 670, for example where two requests are made of a processing module and each is locked out by the presence of the other, a new message is sent to all the deadlocked module 610 to retry the sampling operation. If no messages are received for a specified time period 680, a time out message is returned. An example of one computer program for sampling identified modules is disclosed below.

PROCEDURE ProcessResponse(IN TotalAmpMsgsSent, OUT Results)
1. If timed out waiting for a response from any of the AMPs then
    a. Abort with a time out message and send an abort message to stop processing on the AMPs. Alternatively, invoke default AMP sampling to continue execution or continue with remaining AMPs;
2. If response received, but is not ok then
    a. Abort with the actual error message which caused the problem. Alternatively, invoke default One AMP sampling to continue execution or continue with remaining AMPs;
3. If response received is a deadlock message then
    a. Retry that AMP again by sending one more express request message. This can be retried with a defined limit for retries, after which a deadlock error message could be posted to the user. Alternatively fallback to default One AMP sampling to continue execution or continue with remaining AMPs;
4. If result is Ok then
    a. Save the result in Results;
    b. Decrement the TotalAmpMsgsSent;
5. Go back to step 1. and repeat this process till TotalAmpMsgsSent becomes zero. COMMENT: This means that all AMP responses have been processed. END.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for querying a table, portions of the table being stored on respective processing modules, so that the table is stored across multiple processing modules, the method comprising:
specifying module group characteristics;
identifying a plurality of modules corresponding to the module group characteristics, the plurality of modules being less than all of the multiple processing modules where the table is stored;
sampling the identified modules, but not sampling those modules among the multiple processing modules where the table is stored that are not among the identified modules, for statistics concerning the table specified in a query;
optimizing an execution plan for the query based at least in part on the sampled statistics;
determining a confidence level for the sampled statistics based at least in part on the ratio of the number of identified modules to the number of processing modules in a configuration, the number of processing modules across which the table is stored being less than or equal to the number of processing modules in the configuration, where the step of optimizing is based at least in part on the confidence level; and
executing the optimized execution plan for the query.

2. The method of claim 1 where specifying module group characteristics includes setting an attribute in a definition of the table.

3. The method of claim 1 where specifying module group characteristics includes submitting a diagnostic input associated with the query.

4. The method of claim 1 where the multiple processing modules are organized into nodes and specifying module group characteristics includes specifying all modules in a random node.

5. The method of claim 1 where specifying module group characteristics includes specifying a percentage of all available modules.

6. The method of claim 1 where identifying a plurality of modules includes applying a hash function to an identification of a table to determine a module number.

7. The method of claim 1 where sampling the identified modules for statistics concerning at least one table specified in a query includes determining the number of rows in the table stored on each identified module.

8. The method of claim 1 where optimizing an execution plan for the query based at least in part on the sampled statistics includes optimizing the plan based at least in part on the average of the statistics for the identified modules.

9. A computer program, stored on a computer-readable tangible storage medium, for querying a table, portions of the table being stored on respective processing modules, so that the table is stored across multiple processing modules, the program comprising executable instructions that cause a computer to:

store a specification of module group characteristics;
identify a plurality of modules corresponding to the module group characteristics, the plurality of modules being less than all of the multiple processing modules where the table is stored;
sample the identified modules, but not sample those modules among the multiple processing modules where the table is stored that are not among the identified modules, for statistics concerning the table specified in a query;
optimize an execution plan for the query based at least in part on the sampled statistics;
determine a confidence level for the sampled statistics based at least in part on the ratio of the number of identified modules to the number of processing modules in a configuration, the number of processing modules across which the table is stored being less than or equal to the number of processing modules in the configuration, where the step of optimizing is based at least in part on the confidence level; and
execute the optimized execution plan for the query.

10. The computer program of claim 9 where the specification of module group characteristics is an attribute of the table.

11. The computer program of claim 9 where the specification of module group characteristics is a diagnostic input associated with the query.

12. The computer program of claim 9 where the multiple processing modules are organized into nodes and the module group characteristics are all modules in a random node.

13. The computer program of claim 9 where the module group characteristics are a percentage of all available modules.

14. The computer program of claim 9 where the computer identifies a plurality of modules by at least applying a hash function to an identification of a table to determine a module number.

15. The computer program of claim 9 where the computer samples the identified modules for statistics concerning at least one table specified in a query by at least determining the number of rows in the table stored on each identified module.

16. The computer program of claim 9 where the computer optimizes an execution plan for the query based at least in part on the sampled statistics by at least optimizing the plan based at least in part on the average of the statistics for the identified modules.

17. A database system for executing database queries, comprising:
one or more nodes;
a plurality of CPUs, each of the one or more nodes providing access to one or more CPUs;
a plurality of virtual processors, each of the one or more CPUs providing access to one or more virtual processors;
each virtual processor configured to manage data, including rows organized in tables, stored in one of a plurality of data-storage facilities; and
an optimizer configured to:
store a specification of virtual processor group characteristics;
identify a plurality of virtual processors corresponding to the virtual processor group characteristics;
sample the identified virtual processors for statistics concerning a table specified in a query, portions of the table being stored by each of the plurality of virtual processors, the identified plurality of virtual processors being less than all of the plurality of virtual processors;
optimize an execution plan for the query based at least in part on the sampled statistics, but not on statistics concerning the table from those of the plurality of virtual processors that are not identified;
determine a confidence level for the sampled statistics based at least in part on the ratio of the number of identified virtual processors to the number of virtual processors in a configuration, the number of virtual processors across which the table is stored being less than or equal to the number of virtual processors in the configuration, where the step of optimizing is based at least in part on the confidence level; and
execute the optimized execution plan for the query.

18. The database system of claim 17 where the specification of virtual processor group characteristics is an attribute of the table.

19. The database system of claim 17 where the specification of virtual processor group characteristics is a diagnostic input associated with the query.

20. The database system of claim 17 where the virtual processor group characteristics are all virtual processors in a random node.

21. The database system of claim 17 where the virtual processor group characteristics are a percentage of all available virtual processors.

22. The database system of claim 17 where the computer identifies a plurality of virtual processors by at least applying a hash function to an identification of a table to determine a virtual processor number.

23. The database system of claim 17 where the computer samples the identified virtual processors for statistics concerning at least one table specified in a query by at least determining the number of rows in the table stored on each identified virtual processor.

24. The database system of claim 17 where the computer optimizes an execution plan for the query based at least in part on the sampled statistics by at least optimizing the plan based at least in part on the average of the statistics for the identified virtual processors.

* * * * *